Patented Feb. 21, 1928.

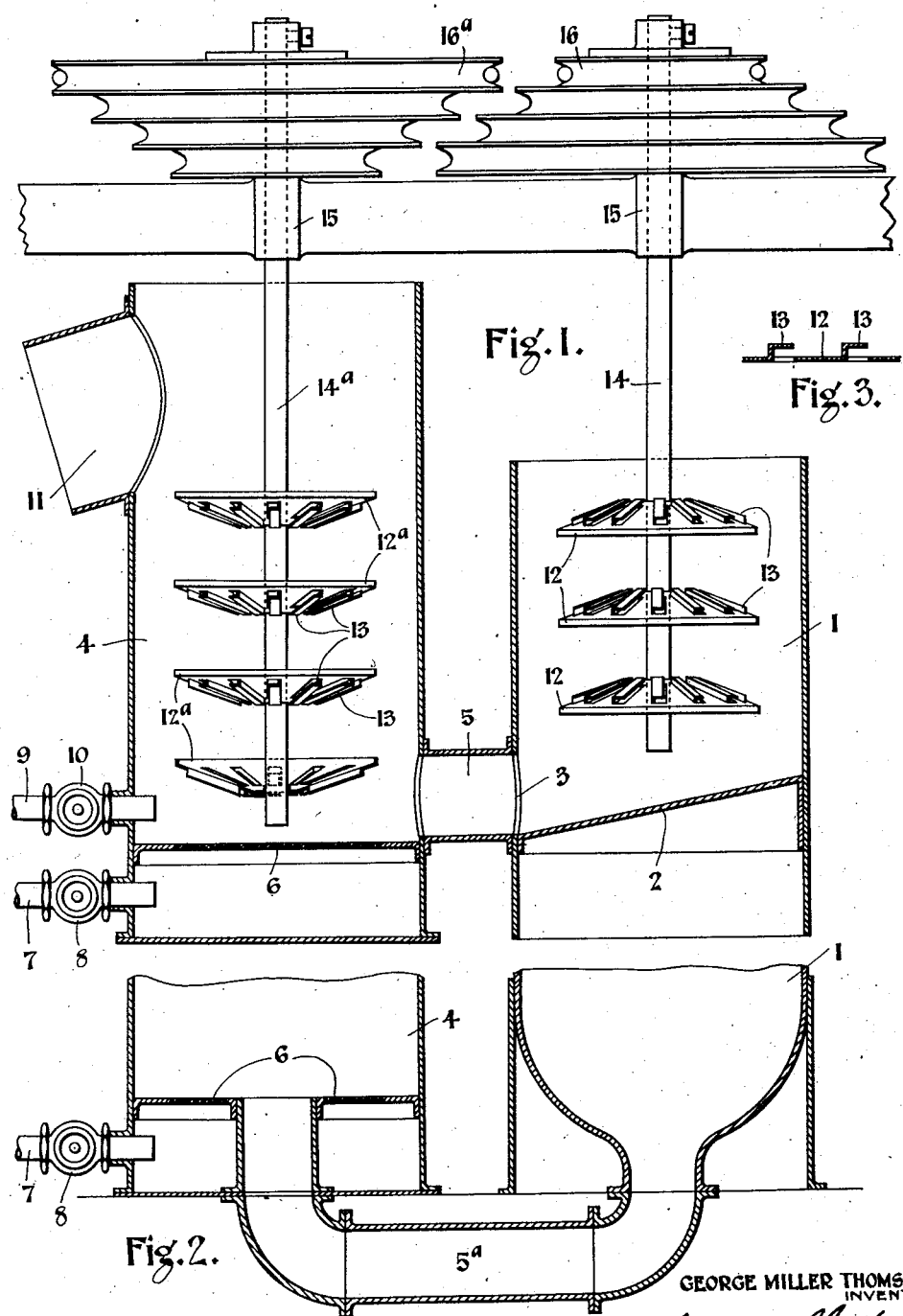

1,660,243

UNITED STATES PATENT OFFICE.

GEORGE M. THOMSON, OF CALEDONIA, ONTARIO, CANADA, ASSIGNOR TO PENNSYLVANIA GYPSUM COMPANY, OF CHESTER, PENNSYLVANIA, A CORPORATION OF DELAWARE.

APPARATUS FOR THE PRODUCTION OF CELLULAR BUILDING MATERIALS.

Original application filed August 10, 1926, Serial No. 128,504, and in Canada February 22, 1927.
Divided and this application filed March 18, 1927. Serial No. 176,559.

This invention relates to an apparatus for producing cellular or porous building or structural material from such substances as gypsum, cements or other suitable materials, and is a division of my application Ser. No. 128,504, filed Aug. 10, 1926.

It is well known that such cellular materials are adapted to resist the transference of heat and sound and are therefore well adapted for certain building requirements.

It is thus an object of this invention to provide a continuous, mechanical process and an apparatus for the economical production of such materials, without the use of the usual chemicals now employed in the processes heretofore known.

Another object of the invention is to provide an apparatus for producing porous building materials, containing gas or air cells of predetermined dimensions, and having a predetermined number of gas or air cells per unit volume. In other words, it is an object of this invention to provide a process for producing a porous building material of predetermined density in a readily controlled manner.

It is a further object of this invention to provide an apparatus for the production of a homogeneous, cellular material, wherein the individual cells and cell walls are of substantially uniform dimensions.

A still further and important object of the invention is to provide for the ready control of the ratios involved in connection with the materials employed in the production of porous building materials.

Other objects of the invention will be apparent from the following description of the invention, the essential features of which will be later defined in the claims.

Such porous materials have heretofore been produced, by causing evolution of a gas in the presence of a slurry of plaster of Paris or quick-setting cement, for example, by the use of sulphate of aluminium and calcium carbonate. Moreover, a colloid has been added to the mix to increase the surface tension of the bubbles formed in the slurry. It will be apparent that, in order to secure desired results in such processes, definite control of the evolution of gas, with respect to the initial setting of the material and the variable factors involved, is of prime importance, but difficult to obtain in the commercial operation of such processes.

The ultimate strength of plaster of Paris or quick-setting cements, subsequent to hydration, setting and drying is dependent, not only on their primary characteristics, but on the amount of water, colloid etc. added thereto in the process of production. Water, in excess of that actually required in the formation of the crystals, lowers the ultimate strength. The same is true of the colloid added. It will therefore be apparent that, in order to secure a product of the required density with maximum strength, definite, ready control of these variable factors is necessary in the production of these materials.

The invention and the manner in which its objects are obtained will now be described with reference to the accompanying drawings in which:

Figure 1 is a sectional elevation of the apparatus,

Figure 2 is a fragmentary sectional elevation of a modified form,

Figure 3 is a section through the vanes of the impeller wheels.

In the drawings 1 is a mixing chamber, having a bottom 2 inclined to the opening 3 leading to an air-mixing chamber 4 through pipe 5. As shown in Figure 2 these two chambers may be connected by means of a pipe or tube 5ª, in which case the bottom of the mixing chamber would be semi-spherical with the exit at the centre. 6 is a perforated partition located just below the feed opening into the air mixing chamber 4, 7 a pipe leading to the chamber at a point below the partition and having a valve 8, while 9 is a pipe leading to the chamber above the partition 6 and having a valve 10. A discharge chute 11 leads from the chamber 4.

Hollow conical impeller wheels 12 and 12ª, having radial blades or vanes 13 as shown, are mounted on shafts 14 and 14ª journalled in bearings 15. The shafts 14 and 14ª are driven by any suitable means with variable speed pulleys 16 and 16ª and are so placed that when the apparatus is in operation, the impeller wheels 12 and 12ª rotate within the chambers 1 and 4 respectively. The impeller wheels 12 are secured to the shaft 14 in an inverted position relative to the wheels 12ᵃ, that is the open end of each wheel faces downwardly, for a purpose to be defined later.

The dry plaster of Paris or cements in use, with the required water for their hydration are fed into the chamber 1, where the rotating impeller wheels 12 thoroughly mix the material and water and on account of the shape and position of the impeller wheels, the mixture or slurry will flow from chamber 1 to the air mixing chamber 4 at a rate controlled by the rate of rotation of the wheels. If desired the dry materials may be gauged before introducing the mixture into chamber 1.

The amount of water of so-called normal consistency is a substantially fixed quantity for any particular plaster of Paris or cement and therefore, this ratio varies only with changes in the characteristics of the material used. At this stage in the process water of normal consistency only is added.

The slurry thus flows into chamber 4 at a predetermined constant rate and gas or air is admitted thereto by opening valve 8. The gas is forced through the perforations in partition 6 and flows in substantially slender columns or streams. The amount of gas or air so admitted will be governed by the porosity or density required in the finished product, and regulated by means of the valve 8.

At the same time colloidalized water, that is water containing a colloid, such as, for example, tannic acid, other organic acids, aldehydes, ketones, saponin sugar, etc. is admitted to chamber 4 by opening valve 10. The water here added is to provide for the formation of gas or air bubbles in the slurry and the colloid is added to increas the surface tension of the bubbles. The water ratio at this point is therefore dependent upon the porosity required in the finished product and the size of the cells to be formed therein. The size of the cells formed is regulated by division of the gas or air admitted to the slurry, to form volumes of the desired size to be surrounded by the colloidalized water to form bubbles. This division of the gas or air to regulate the cell size is effected, by rotation of the impeller wheels 12ᵃ, whereby the streams or columns of gas are divided into volumes, which becomes surrounded with films of the colloidalized water forming bubbles. In the upward travel of the slurry and bubbles the latter are subdivided more or less until the last impeller wheel has been passed and the desired size of bubble has been formed in the slurry. It will be apparent that the rate of travel of the shaft 14ᵃ, the number of impeller wheels employed and the number of vanes or blades on the wheels will determine the extent to which the air is subdivided and therefore the size of cells formed in the finished material.

When the slurry, impregnated with bubbles, reaches the discharge opening, it flows down the chute 11 and is shaped and allowed to set in accordance with the use to which the porous material is to be put.

From what has been said, it will be apparent that, since the amount of water added for bubble formation is directly related to the amount of gas or air introduced into the slurry and since the amount of colloidalizer is related directly to the amount of gas or air introduced, the amount of colloidalizer can be related directly to the amount of water introduced. Therefore, a colloidalized water solution, of predetermined colloid content, can be added to the slurry in direct relation to the amount of gas or air introduced, for the purpose of expanding the mass uniformly and producing a porous or cellular mass of predetermined density.

This invention thus provides for direct mechanical control of the variable factors involved in the production of porous or cellular building materials of a desired density.

The term "slurry" used in this specification and the claims is intended to define the wet mass of plaster of Paris or quick-setting cement containing water of so-called normal consistency and by "water of normal consistency" is meant the amount required for hydration of such materials as set forth in standard specifications.

While a specific embodiment of the invention has been described in some detail, it will be obvious that various modifications and changes may be made, without departing from the spirit or scope of the invention as defined in the following claims. The invention has been described with particular reference to a continuous process, but it is obviously applicable to the so-called "batch-process" as well.

While I have described in this application a complete process and the apparatus employed for operating it, it is to be noted that claims specific to the important feature, relating to the regulation of the admission of colloid and water, in excess of that of normal consistency, are not embodied herein, but are made the subject of another application filed concurrently herewith.

I claim:

1. Apparatus for the production of porous building materials comprising, in combination, a slurry mixing chamber having an outlet at the bottom, means in said chamber to agitate the slurry and cause a downward flow thereof, a gas mixing chamber connected with the outlet of said chamber having a perforated partition near its bottom, means for admitting gas below said partition, and means for subdividing the volumes of gas passing through the perforations in said partition.

2. Apparatus for the production of porous building materials comprising, in combination, a slurry mixing chamber having an outlet at the bottom, means in said chamber to agitate the slurry and cause a downward flow thereof, a gas mixing chamber connected with the outlet of said chamber having a perforated partition near its bottom, means for admitting gas below said partition, and means for subdividing the volumes of gas passing through the perforations in said partition, said last named means comprising hollow, conical impeller wheels mounted on a shaft and having radial blades, adjacent radial openings in said wheels.

3. Apparatus for the production of porous building materials comprising, in combination, a slurry mixing chamber having an outlet at the bottom, means in said chamber to agitate the slurry and cause a downward flow thereof, a gas mixing chamber connected with the outlet of said chamber having a perforated partition near its bottom, means for admitting gas below said partition, means for subdividing the volumes of gas passing through the perforations in said partition and means for rotating said agitating means and said gas subdividing means at variable rates.

4. Apparatus for the production of cellular building material comprising a slurry tank adapted to contain liquid and solid material, agitating means therein adapted to cause a downward flow of the material, a second tank adapted to contain a slurry, means to establish communication between the lower portions of said tanks, a sloping bottom in said slurry tank adapted to direct material into said communicating means, agitating means in said second tank, said agitating means adapted to cause an upward flow of material in said tank, a perforated plate disposed in the second tank defining a chamber near the bottom thereof, a gas inlet below said plate, a water inlet disposed above said plate, and discharge means at the top of said tank.

5. Apparatus for the production of cellular building material comprising a slurry tank adapted to contain liquid and solid material, agitating means therein adapted to cause a downward flow of the material, a second tank adapted to contain a slurry, means to establish communication between the lower portions of said tanks, a sloping bottom in said slurry tank adapted to direct material into said communicating means, agitating means in said second tank, said agitating means adapted to cause an upward flow of material in said tank, a perforated plate disposed in the second tank defining a chamber near the bottom thereof, a gas inlet below said plate, a water inlet disposed above said plate, discharge means at the top of said tank and means associated with the respective agitating means whereby differential speeds may be obtained.

6. Apparatus for the production of cellular building material comprising in combination with a slurry mixing chamber, variable means for admitting to said chamber a variably controlled flow of air in fine streams, means for admitting colloidized water to said chamber and for regulating the admission of said water, means for progressively subdividing said streams of air to form bubbles and discharge means for said chamber.

7. Apparatus for the production of cellular building material, comprising in combination, a slurry mixing chamber having a discharge opening, means in said chamber to impel the slurry to said discharge opening, variable means in said chamber for admitting air to form bubbles in the slurry and means completely submerged in the slurry for progressively subdividing said bubbles.

8. Apparatus as defined in claim 7 having means for varying the speed of said submerged means.

In testimony whereof I affix my signature.

GEORGE M. THOMSON.